United States Patent [19]
Johnson, Jr.

[11] Patent Number: 5,588,772
[45] Date of Patent: *Dec. 31, 1996

[54] HIGH STRENGTH, QUICK CONNECT/DISCONNECT COUPLING

[75] Inventor: George P. Johnson, Jr., Tomball, Tex.

[73] Assignee: North Houston Machine, Inc., Tomball, Tex.

[*] Notice: The term of this patent shall not extend beyond the expiration date of Pat. No. 5,409,324.

[21] Appl. No.: 403,279

[22] Filed: Mar. 13, 1995

Related U.S. Application Data

[63] Continuation-in-part of Ser. No. 82,663, Jun. 25, 1993, Pat. No. 5,409,324.

[51] Int. Cl.⁶ ............................. F16L 25/06; F16B 21/12
[52] U.S. Cl. ..................... 403/355; 403/378; 403/318; 285/86; 285/330
[58] Field of Search ....................... 403/355, 378, 403/318, 377, 376, 316; 285/81, 84, 86, 330, 328, 421, 305

[56] References Cited

U.S. PATENT DOCUMENTS

| | | | |
|---|---|---|---|
| 573,695 | 12/1896 | Penfield | 285/421 |
| 688,860 | 12/1901 | Kay et al. | 403/355 |
| 774,398 | 11/1904 | Reine. | |
| 1,692,565 | 11/1928 | Paul. | |
| 2,032,491 | 3/1936 | Moreland. | |
| 2,756,022 | 7/1956 | Sturgeon. | |
| 2,795,398 | 6/1957 | Ragland. | |
| 3,215,974 | 11/1965 | Wooding. | |
| 3,301,009 | 1/1967 | Coulter, Jr.. | |
| 3,315,993 | 4/1967 | Church. | |
| 3,433,512 | 3/1969 | Kraft. | |
| 3,574,359 | 4/1971 | Klein | 285/86 |
| 4,192,155 | 3/1980 | Gray. | |
| 4,288,172 | 9/1981 | Livesay et al.. | |
| 4,311,224 | 1/1982 | Kato et al.. | |
| 4,433,861 | 2/1984 | Kreczik | 285/305 |
| 4,448,564 | 5/1984 | Orszulak | 403/318 |
| 4,485,880 | 12/1984 | Makohl. | |
| 4,519,638 | 5/1985 | Yodoshi et al. | 285/305 |
| 4,557,508 | 12/1985 | Walker | 285/84 |
| 4,759,738 | 7/1988 | Johnson. | |
| 4,893,962 | 1/1990 | Komeyama. | |

OTHER PUBLICATIONS

North Houston Machine Inc., "NHM Inc. Product Catalog 1994 Drilling Tools & Supply", Jan. 1994.

Primary Examiner—Anthony Knight
Attorney, Agent, or Firm—Pravel, Hewitt, Kimball & Krieger

[57] ABSTRACT

A coupling for transferring torque and axial force from a first member to a second member. The coupling includes a first cylindrical member having an outer peripheral surface and an end portion and a second cylindrical member having a receiving end portion. The receiving end portion has an end face with a longitudinal bore in the receiving end portion for receiving the end portion of the first cylindrical member. The end portion of the first cylindrical member has a plurality of transverse keyways in the outer peripheral surface. The receiving end portion of the second cylindrical member has a plurality of transverse slots in the receiving end portion corresponding to the plurality of transverse keyways. A key is received in each transverse keyway and protrudes from each transverse keyway into the corresponding transverse slot. A retainer ring has a bore such that the retainer ring extends over the plurality of transverse slots of the receiving end portion of the second cylindrical member. The keys axially and non-rotatably connect the first member to the second member.

19 Claims, 4 Drawing Sheets

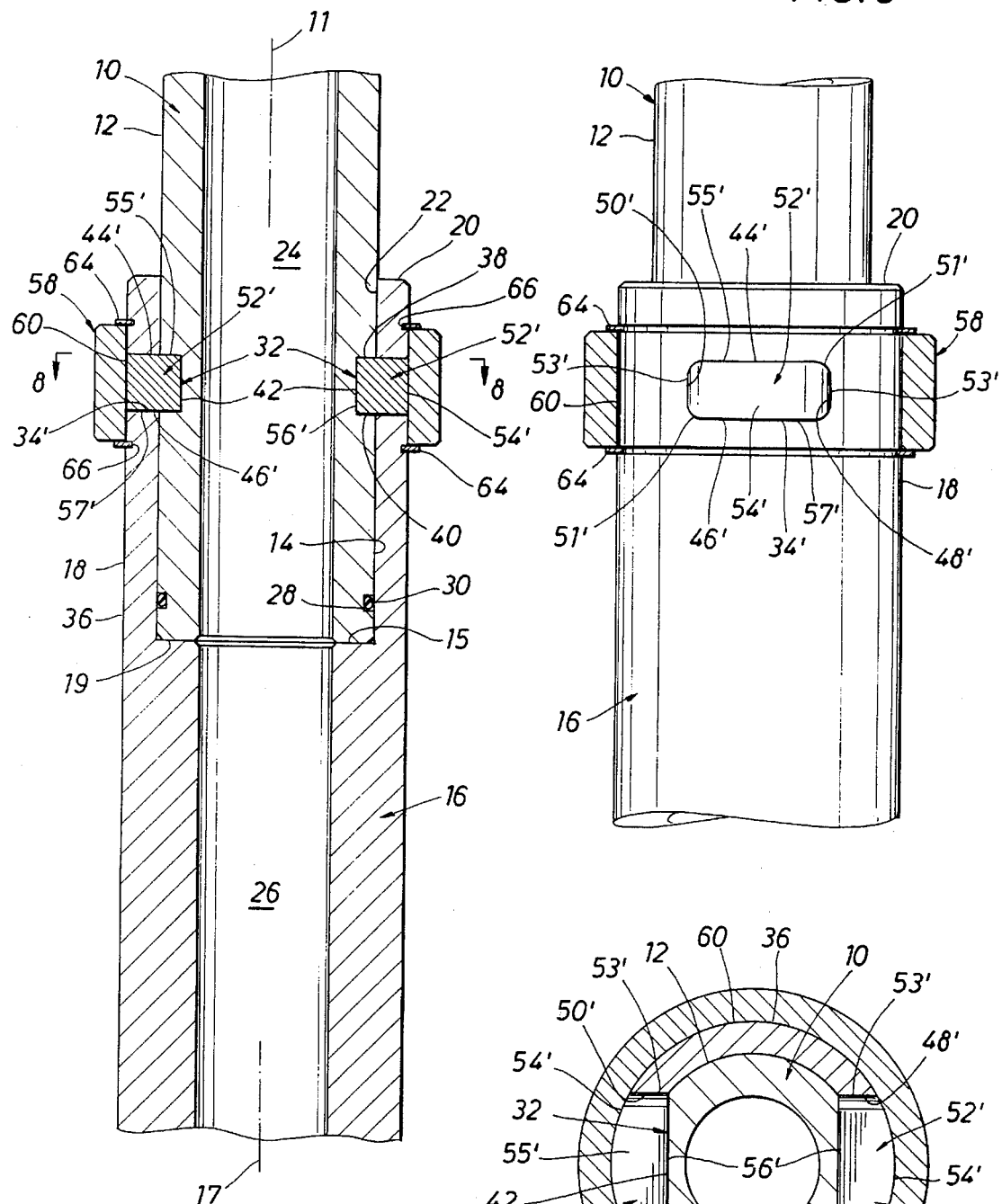
FIG. 6
FIG. 7
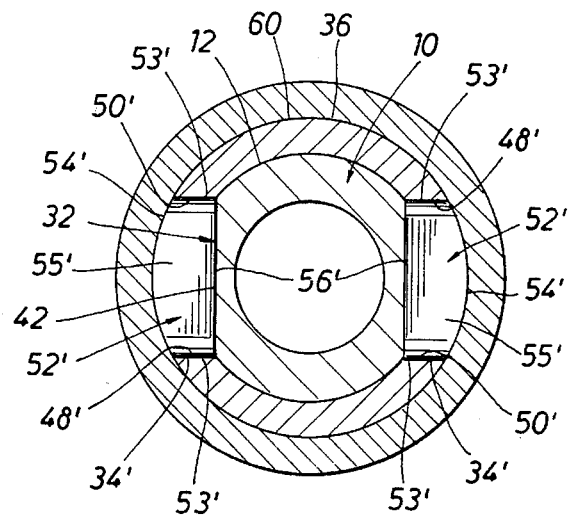
FIG. 8

5,588,772

HIGH STRENGTH, QUICK CONNECT/DISCONNECT COUPLING

This application is a continuation-in-part of U.S. application Ser. No. 082,663, filed Jun. 25, 1993, U.S. Pat. No. 5,409,324, for HIGH STRENGTH, QUICK CONNECT/DISCONNECT COUPLING.

BACKGROUND OF THE INVENTION

1. Field of the Invention

The present invention relates to a high strength coupling which transfers axial force and torque from one member to another via a key and keyway arrangement.

2. Description of the Prior Art

Many types of couplings have been used to connect one cylindrical member to another. In many instances, it is necessary to transfer axial force and torque from one shaft or pipe member to a second shaft or pipe member. Oftentimes, it is desirable that the coupling be easy to connect and disconnect which eliminates connecting the members by a permanent means such as welding.

Threaded couplings have been used to provide a quick connect/disconnect coupling. Threaded couplings transfer axial compressive and tensile forces and torque in one direction about the longitudinal axis. Threaded couplings have the disadvantage in that the threaded coupling will not take high torque loads in both the clockwise and counterclockwise directions due to the threaded make-up of the coupling. Furthermore, the threaded coupling is extremely difficult to disconnect after prolonged periods of torque transfer due to the frictional engagement of the threads. Threaded couplings are also subject to damaged threads and cross-threading during the coupling make-up which can result in the replacement of the coupling member.

Various arrangements of keys and keyways have been used to form axial load and torque transferring couplings as, for example, shown in U.S. Pat. Nos. 4,893,962, 3,433,512, 3,315,993, 2,756,022, and 2,032,491. Typically, in key/keyway couplings, the key is subjected to shear stress both by the torque and the axial load. Shear stress is directly proportional to the cross-sectional area of the key in shear. The maximum design rating for the coupling is often limited by the shear stress of the key.

U.S. Pat. No. 573,695 discloses a coupling for joining an inner cylindrical tube to an outer cylindrical tube wherein the inner cylindrical tube includes a transverse keyway and the outer cylindrical tube includes a transverse slot. A key having an arcuate surface extends through the slot and into the keyway. A retaining band is driven over the arcuate surface of the key thereby forcing the key inward to complete the joint. The downward pressure applied to the key by the retaining band causes the inner tube to expand somewhat or spring into more intimate binding contact with the outer tube.

U.S. Pat. No. 2,756,022 discloses a shock absorber coupling wherein an inner cylindrical tube is joined to an outer cylindrical tube. The inner cylindrical tube includes a longitudinal keyway and the outer cylindrical tube includes an elongated longitudinal slot. A rectangular key extends through the longitudinal slot and into the longitudinal keyway. A retaining sleeve is positioned over the longitudinal keyway and the rectangular key to maintain the connection of the inner and outer cylindrical members.

It is desirable to have a high strength coupling which can transfer both axial tensile and compressive forces and torque in both directions around the longitudinal axis of the connected members. The high strength coupling should be of simple construction, low cost and quick and easy to connect and disconnect.

SUMMARY OF THE PRESENT INVENTION

The present invention is a high strength coupling which can transfer both axial tensile and compressive forces and torque in both directions around the longitudinal axis of the connected members. The coupling is simple in construction, economical, compact and easy to assemble and disassemble. The coupling can be quickly and easily connected and disconnected.

The high strength coupling of the present invention transfers torque and axial force from a first member to a second member. The coupling includes a first cylindrical member having an outer peripheral surface and an end portion and a second cylindrical member having a receiving end portion. The receiving end portion has an end face with a longitudinal bore therein for receiving the end portion of the first cylindrical member. The end portion of the first cylindrical member has a plurality of transverse keyways in the outer peripheral surface. The receiving end portion of the second cylindrical member has a plurality of transverse slots therein corresponding to the plurality of transverse keyways. A key is received in each transverse keyway and protrudes therefrom into the corresponding transverse slot. A retainer ring has a bore therethrough such that the retainer ring extends over the plurality of transverse slots of the receiving end portion of the second cylindrical member. The keys axially and non-rotatably connect the first member to the second member and provide a high strength coupling. Torsional forces radially force the keys against the retainer ring. The retainer ring counteracts the torsional forces and results in an extremely high strength coupling.

BRIEF DESCRIPTION OF THE DRAWINGS

In order to more fully understand the drawings referred to in the detailed description of the present invention, a brief description of each drawing is presented, in which:

FIG. 6 is an elevational view of the high strength coupling according to a fourth embodiment of the present invention with a retainer ring shown in cross-section;

FIG. 7 is an elevational view in cross-section of the high strength coupling according to the fourth embodiment of the present invention; and FIG. 8 is a view taken along line 8—8 of FIG. 7.

DETAILED DESCRIPTION OF THE INVENTION

Figures 1, 2:
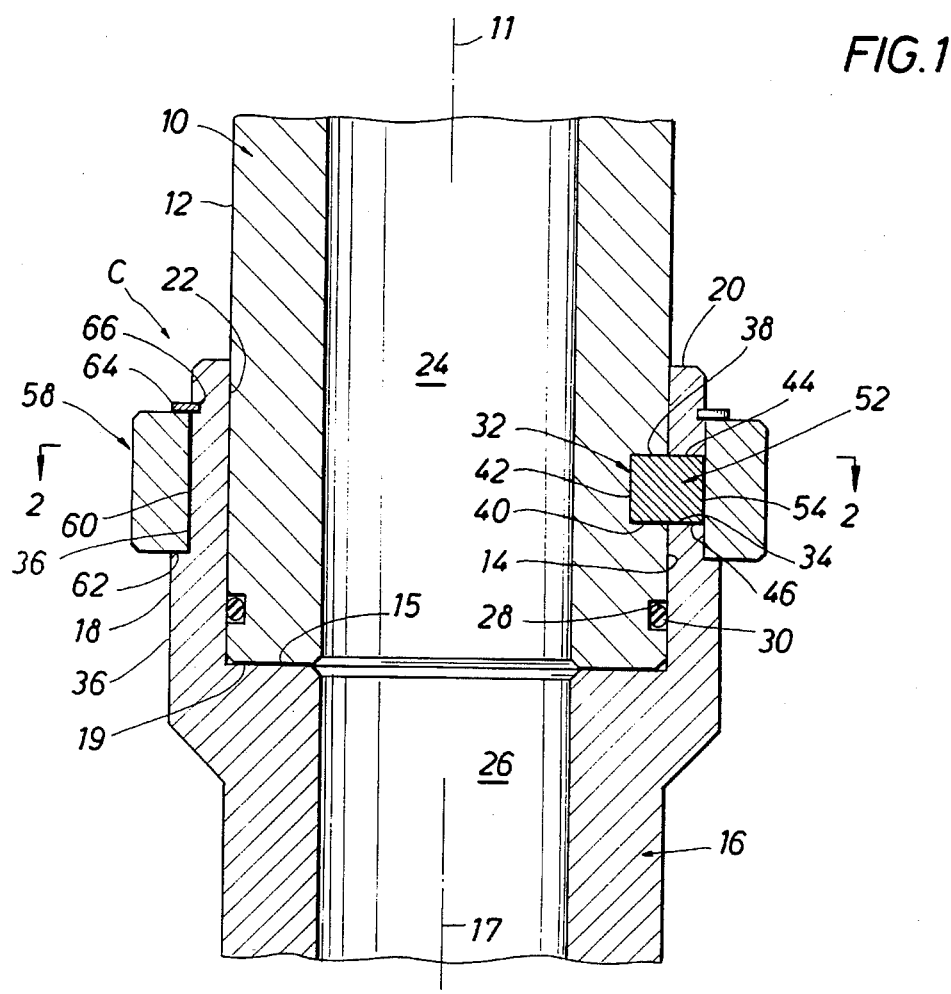
FIG. 1 is an elevational view in cross-section of the high strength coupling according to a first embodiment of the present invention.
FIG. 2 is a view taken along line 2—2 of FIG. 1.

Referring now to the drawings in greater detail, the high strength coupling of the present invention, generally designated by the letter C, comprises a first cylindrical member 10 having an outer peripheral surface 12 and an end portion 14 with an end face 15. The coupling C includes a second cylindrical member 16 having a receiving end portion 18. Referring to FIGS. 1, 3, 4 and 7, the receiving end portion 18 has an end face 20 with a longitudinal bore 22 therein for receiving the end portion 14 of the first cylindrical member 10. The receiving end portion 18 includes an internal shoulder 19 at the inner end of the longitudinal bore 22. The first cylindrical member 10 has a longitudinal axis 11 and the second cylindrical member 16 has a longitudinal axis 17 as shown in FIGS. 1, 3, 4 and 7.

For purposes of illustration, the first and second members 10 and 16, respectively, have been shown as having a longitudinal bore 24 and 26, respectively, therethrough which are in axial alignment and form a continuous throughbore in the coupled configuration as shown in FIGS. 1, 3, 4 and 7. A circumferential groove 28 in the peripheral surface 12 of the end portion 14 of the first member 10 receives a seal means 30, as for example an O-ring, to provide a fluid-tight seal between the first and second members 10 and 16, respectively. Alternatively, the circumferential groove 28 and the seal means 30 could be included in either the end face 15 of the first cylindrical member 10 or the shoulder 19 of the second cylindrical member 16. It is to be understood that the first and second members 10 and 16, respectively, could also be solid members with no throughbores 24 and 26, respectively, such as shafts. In such a case, the circumferential groove 28 and seal means 30 would not be necessary.

Referring to FIGS. 1–5, 7 and 8, the end portion 14 of the first cylindrical member 10 has one or more transverse keyways 32 in the outer peripheral surface 12. Each keyway 32 includes a pair of parallel side surfaces 38 and 40 and a bottom surface 42 therebetween. Preferably, the bottom surface 42 is parallel to a plane tangential to the outer peripheral surface 12 of the first cylindrical member 10. Due to the curvature of the outer peripheral surface 12 of the first cylindrical member 10, each keyway 32 gradually decreases in depth from its middle to its ends where it merges into the outer peripheral surface 12 of the first member 10.

In the first embodiment shown in FIGS. 1 and 2, the first cylindrical member 10 is shown as having three transverse keyways 32 which are equidistantly spaced from one another in a common plane transverse to the longitudinal axis 11. It is to be understood that the coupling C can have one or more transverse keyways 32 although three is preferable in a common plane. If the coupling C has two transverse keyways 32, the transverse keyways 32 should be displaced 180° from each other. In the embodiment shown in FIGS. 4 and 5, the transverse keyways 32 are equidistantly spaced about the longitudinal axis 11 in separate parallel planes. This "staggered" configuration serves to further improve the stress characteristics of the first cylindrical member 10 and may be preferred in those applications where the increased length of the coupling C is of no concern. Alternatively, two or more sets of a plurality of transverse keyways 32 could be placed in two parallel planes. The exact configuration to use will depend on various design, manufacturing and economic parameters.

Figure 3:
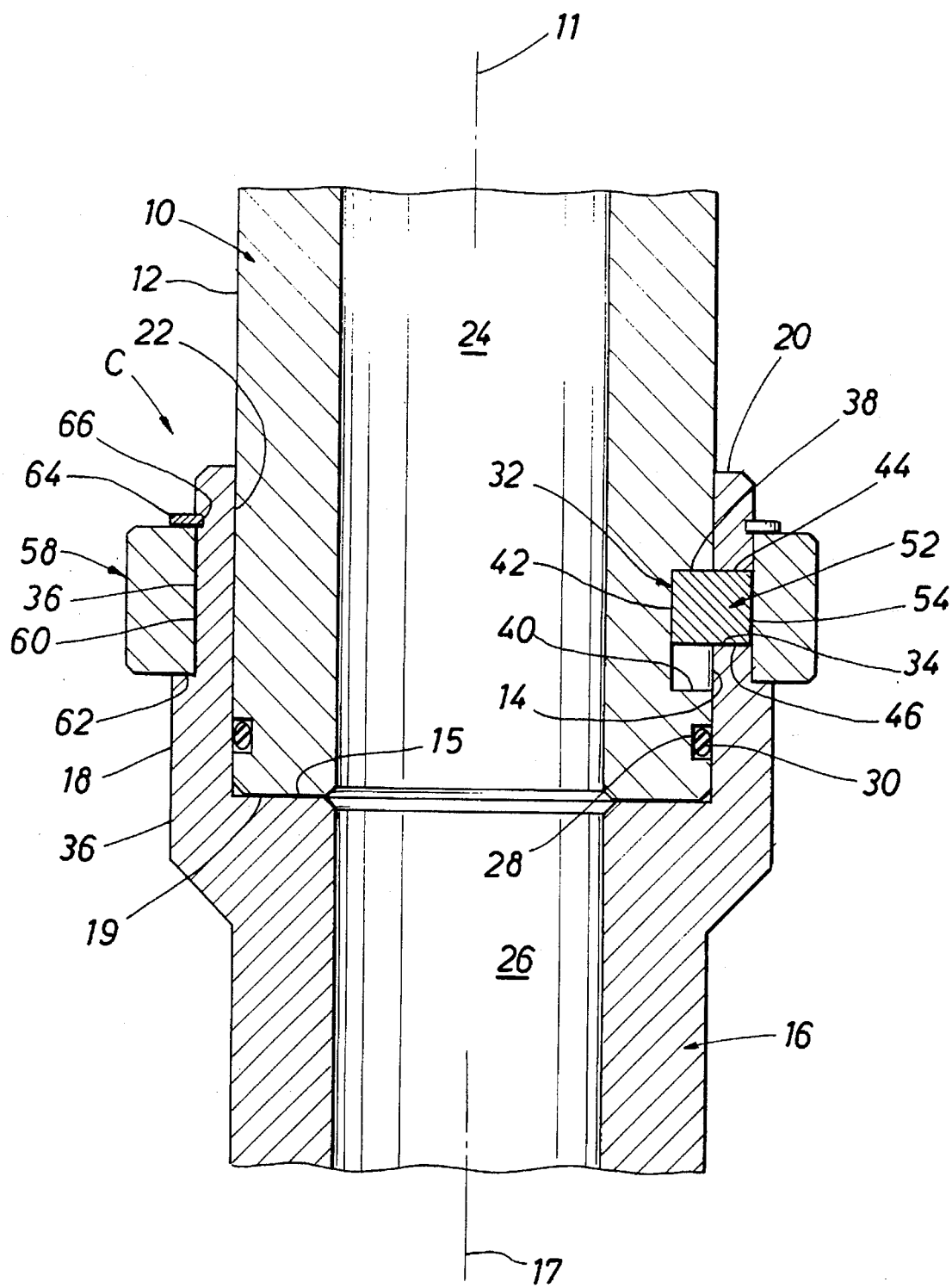
FIG. 3 is an elevational view in cross-section of the high strength coupling according to a second embodiment of the present invention.
Figure 4:
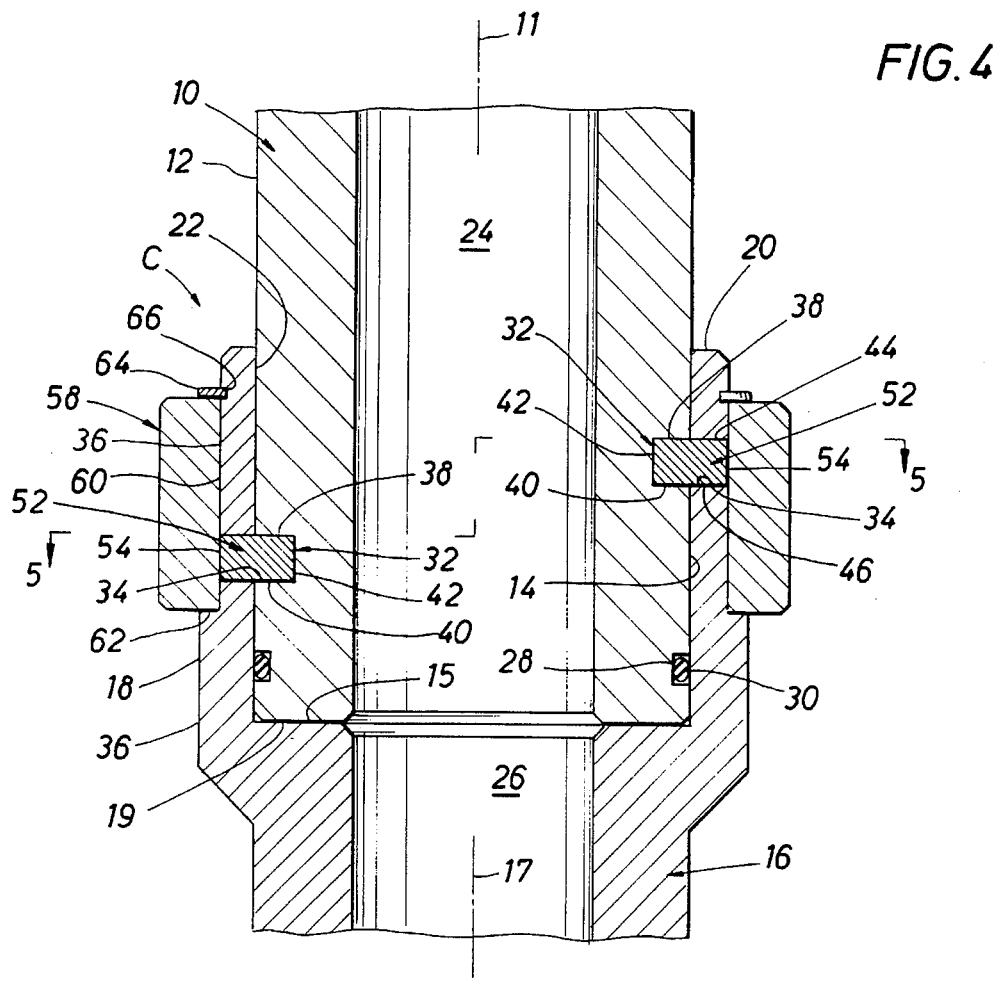
FIG. 4 is an elevational view in cross-section of the high strength coupling according to a third embodiment of the present invention.
Figure 5:
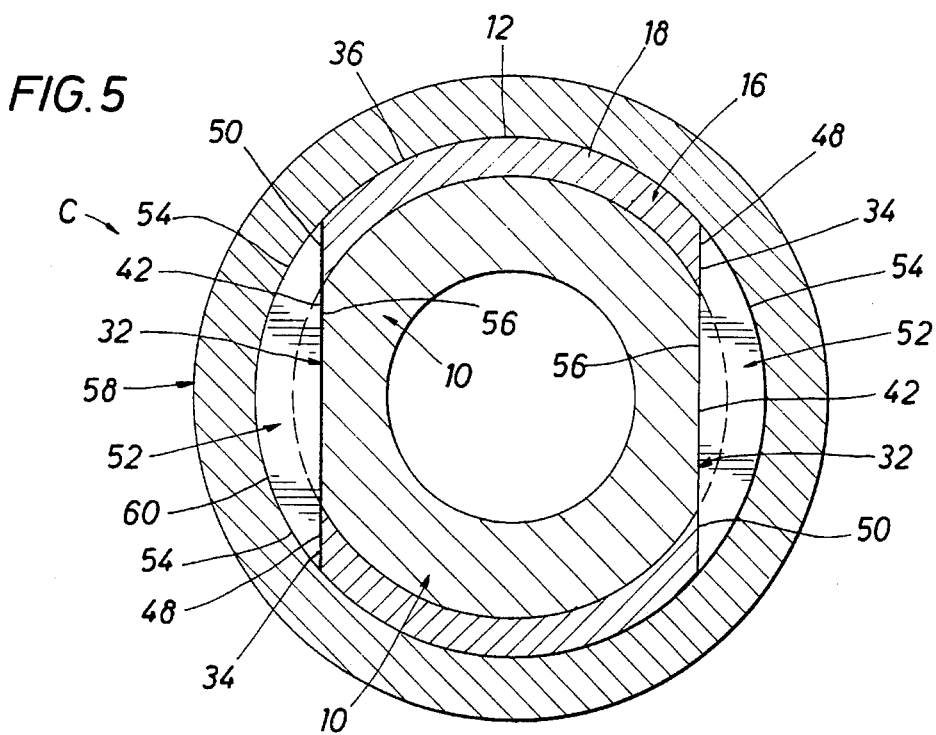
FIG. 5 is a view taken along line 5—5 of FIG. 4.

In the embodiments shown in FIGS. 1–5, the receiving end portion 18 of the second cylindrical member 16 has a cylindrical outer surface 36 and one or more transverse slots 34 therein. Each transverse slot 34 includes a pair of parallel side walls 44 and 46 and a pair of end walls 48 and 50 therebetween as shown in FIGS. 2 and 5. In the embodiments shown in FIGS. 1–5, the pair of end walls 48 and 50 are in generally planer alignment with the bottom surface 42 of the corresponding transverse keyway 32. The number of transverse slots 34 corresponds to the number of transverse keyways 32.

Still referring to the embodiments shown in FIGS. 1–5, a key 52 is received in each transverse keyway 32 and protrudes therefrom into the corresponding transverse slot 34. Each key 52 has an arcuate surface 54 corresponding to the cylindrical outer surface 36 of the receiving end portion 18 of the second cylindrical member 16 and a substantially planer surface 56 having a length of approximately the distance between the corresponding pair of end walls 48 and 50 at the cylindrical outer surface 36. Each key 52 has a thickness approximating the distance between the pair of parallel side walls 44 and 46 of the corresponding transverse slot 34. Typically, the distance between the corresponding pair of parallel side surfaces 38 and 40 of the transverse keyway 32 approximates the thickness of the key 52.

Typically, it may be desirable to have the end face 15 of the first cylindrical member 10 in substantially abutting contact with the shoulder 19 of the second cylindrical member 16 to lessen or eliminate the shear stress in the keys 52 when the coupling C is subjected to compressive axial loading.

In some instances, it may be desirable to have a coupling C which, in addition to transferring axial loads and torque, will also allow a generally small amount of axial movement of the first and second members 10 and 16, respectively, relative to one another. One such example is a shock absorber coupling for a rotary drill stem as described in U.S. Pat. No. 2,756,022. In the present invention, relative axial movement between the first and second members 10 and 16, respectively, can be accomplished by increasing the distance between the pair of parallel side surfaces 38 and 40 of the transverse keyway 32 as shown in FIG. 3. The keys 52 will remain in place by the surface contact with the bottom surface 42 of the transverse keyway 32, the transverse slot side walls 44 and 46, and a retainer ring 58 as described below.

With specific reference to the embodiment shown in FIGS. 6–8, the receiving end portion 18 of the second cylindrical member 16 has a cylindrical outer surface 36 and one or more transverse slots 34' therein. Each transverse slot 34' includes a pair of parallel side walls 44' and 46' and a pair of end walls 48' and 50' therebetween as shown in FIGS. 6 and 8. In the embodiment shown in FIGS. 6–8, the pair of end walls 48' and 50' are generally transverse to the bottom surface 42 of the corresponding transverse keyway 32. As shown in FIG. 6, the transverse slots 34' preferably include rounded corners 51' where the side walls 44', 46' meet the end walls 48', 50'. The rounded corners 51' distribute the stress over a large area and eliminate high concentrated stress points located at sharp corners. The number of transverse slots 34' corresponds to the number of transverse keyways 32.

With reference to the embodiment shown in FIGS. 6–8, a key 52' is received in each transverse keyway 32 and protrudes therefrom into the corresponding transverse slot 34. Each key 52' has an arcuate surface 54' corresponding to the cylindrical outer surface 36 of the receiving end portion 18 of the second cylindrical member 16 and a substantially planer surface 56' having a length of approximately the length of the bottom surface 42 of the transverse keyway 32. Each key 52' includes a pair of end faces 53' which are substantially transverse to the planer surface 56' as shown in FIG. 8. Preferably, the end faces 53' are also rounded where the end face 53' meets the upper and lower faces 55' and 57', respectively, of the key 52' to cooperatively fit with the rounded corners 51 of the transverse slot 34. Each key 52' has a thickness approximating the distance between the pair of parallel side walls 44 and 46 of the corresponding transverse slot 34. Typically, the distance between the corresponding pair of parallel side surfaces 38 and 40 of the transverse keyway 32 approximates the thickness of the key 52'.

As indicated above, it is typically desirable to have the end face 15 of the first cylindrical member 10 in substantially abutting contact with the shoulder 19 of the second cylindrical member 16 to lessen or eliminate the shear stress in the keys 52' when the coupling C is subjected to compressive axial loading. It is to be further understood that the embodiment shown in FIGS. 6-8 and as described above may also be modified and utilized in the same manner as the previous embodiments described above and/or shown in FIGS. 1-5.

Referring to FIGS. 1-8, the retainer ring 58 has a bore 60 therethrough such that the retainer ring 58 extends over the plurality of transverse slots 34, 34' of the receiving end portion 18 of the second cylindrical member 16. The diameter of the bore 60 generally corresponds to the outer diameter of the receiving end portion 18 proximate to the transverse slots 34, 34'. The retainer ring 58 can be maintained in position over the transverse slots 34, 34' in various ways. FIGS. 1, 3 and 4 show the cylindrical outer surface 36 of the receiving end portion 18 having a shoulder 62 abutting the retainer ring 58 and a ring 64, such as a snap ring, inserted in an outer groove 66 to limit the movement of the retainer ring 58 in the longitudinal direction. FIGS. 7 and 8 show a pair of rings 64 inserted in a pair of outer grooves 66 to limit the longitudinal movement of the retainer ring 58. Alternatively, the retainer ring 58 could be maintained in position by one or more set screws (not shown) extending through the side of the retainer ring 58 and engaging the receiving end portion 18 of the second member 16. Other means for maintaining the retainer ring 58 in place include clamps, split ring clamps, swedge locks, drilled and tapped bolts, or weld metal placed adjacent to the desired position of the retainer ring 58 to name a few. Alternatively, with reference to FIGS. 7 and 8, the retainer ring 58 could be extended in length and include an upper inner flange which would contact end face 20 and be further provided with a set screw for maintaining the retainer ring 58 in this position. As can be easily seen by the foregoing examples, the retainer ring 58 may include any one of a wide variety of means for maintaining the retainer ring 58 in the The retainer ring 58 maintains the keys 52, 52' in the transverse slots 34, 34' and the transverse keyways 32 and between the bottom surface 42 of the transverse keyway 32 and the retainer ring 58.

The assembly of the various embodiments of the high strength coupling C is essentially the same for all of the embodiments. The assembly of the embodiments shown in FIGS. 1-5 will first be described followed by a description of the embodiment shown in FIGS. 6-8.

Referring to FIGS. 1-5, the high strength coupling C is assembled by placing the snap ring 64 and the retainer ring 58 over the end portion 14 of the first cylindrical member 10 and then inserting the end portion 14 of the first cylindrical member 10 into the receiving end portion 18 of the second cylindrical member 16. The transverse keyways 32 are aligned with the transverse slots 34. The keys 52 are inserted through the transverse slots 34 until the planer surface 56 of the keys 52 contacts the bottom surface 42 of the transverse keyways 32 and the pair of end walls 48 and 50 of the transverse slots 34. When the keys 52 are installed, the arcuate surface 54 of the key 52 is substantially flush with the adjacent cylindrical outer surface 36 of the receiving end portion 18 of the second cylindrical member 16 as shown in FIGS. 2 and 5. The retainer ring 58 is slid onto the receiving end portion 18 of the second cylindrical member 16 and over the transverse slots 34 and keys 52. The retainer ring 58 abuts the shoulder 62 and the snap ring 64 is installed in the outer groove 66. The keys axially and nonrotatably connect the first member to the second member and provide a high strength coupling.

Preferably, the keys 52 freely slide through the transverse slots 34 and into the transverse keyways 32 so that upon assembly and disassembly of the coupling C the keys 52 are easily installed and removed, respectively. It is desirable that the clearance between the keys 52 and the transverse slots 34 and the transverse keyways 32 be extremely small, for example on the order of approximately "0.002" or less to minimize the "play" in the coupling C while permitting easy installation and removal of the keys 52.

In use, upon rotational force being applied to the first cylindrical member 10, the bottom surface 42 of the transverse keyways 32 attempts to rotate the keys 52. For exemplary purposes, the rotational force shall be assumed to be applied in a clockwise direction. Assuming that the second cylindrical member 16 does not freely rotate, the keys 52 are resisted by the end walls 50 of the transverse slots 34. The rotational force radially forces the keys 52 against the retainer ring 58. The retainer ring 58 counteracts the outward radial force of the keys 52 and distributes the torque load among the coupling components which results in an extremely high strength coupling. The retainer ring 58 is subjected to radial tensile force by the keys 52. The thickness of the retainer ring 58 can be designed to counteract the radial tensile forces expected to be experienced by the coupling C to prevent shear failure of the retainer ring 58. The keys 52 are subjected to shear stress by the applied axial load. The dashed lines in FIGS. 2 and 5 coincide with a shear line in the keys 52 under axial loading of the coupling C.

Referring to FIGS. 6-8, this embodiment of the high strength coupling C is assembled by placing the upper snap ring 64 and the retainer ring 58 over the end portion 14 of the first cylindrical member 10. The lower snap ring 64 is also either placed over the end portion 14 or installed in the lower outer groove 66 of the second cylindrical member 16. The end portion 14 of the first cylindrical member 10 is inserted into the receiving end portion 18 of the second cylindrical member 16. The transverse keyways 32 are aligned with the transverse slots 34'. The keys 52' are inserted through the transverse slots 34' until the planer surface 56' of the keys 52' contacts the bottom surface 42 of the transverse keyways 32 and the pair of end walls 48' and 50' of the transverse slots 34'. When the keys 52' are installed, the arcuate surface 54' of the key 52' is substantially flush with the adjacent cylindrical outer surface 36 of the receiving end portion 18 of the second cylindrical member 16 as shown in FIGS. 7 and 8. The retainer ring 58 is slid onto the receiving end portion 18 of the second cylindrical member 16 and over the transverse slots 34' and keys 52'. The retainer ring 58 abuts the lower snap ring 64 and the upper snap ring 64 is installed in the upper outer groove 66. The keys 52' axially and non-rotatably connect the first member 10 to the second member 16 and provide a high strength coupling C.

Preferably, the keys 52' freely slide through the transverse slots 34' and into the transverse keyways 32 so that upon assembly and disassembly of the coupling C the keys 52' are easily installed and removed, respectively. It is desirable that the clearance between the keys 52' and the transverse slots 34' and the transverse keyways 32 be extremely small, for example on the order of approximately 0.002Δ or less to minimize the "play" in the coupling C while permitting easy installation and removal of the keys 52'.

In use, upon rotational force being applied to the first cylindrical member 10, the bottom surface 42 of the transverse keyways 32 attempts to rotate the keys 52'. For exemplary purposes, the rotational force shall be assumed to be applied in a clockwise direction. Assuming that the second cylindrical member 16 does not freely rotate, the keys 52' are resisted by the end walls 50' of the transverse slots 34'. The rotational force radially forces the keys 52' against the retainer ring 58. The retainer ring 58 counteracts the outward radial force of the keys 52' and distributes the torque load among the coupling components which results in an extremely high strength coupling. The retainer ring 58 is subjected to radial tensile force by the keys 52'. The thickness of the retainer ring 58 can be designed to counteract the radial tensile forces expected to be experienced by the coupling C to prevent shear failure of the retainer ring 58. The keys 52' can be subjected to shear stress by applying an axial load.

Preferably, the members used in the high strength coupling C of the present invention are made of high strength steels to provide a very strong coupling. The cylindrical members of the high strength coupling C are interengaged by the key or keys independent of deformation of the cylindrical members.

The high strength coupling C of the present invention uniquely distributes the torque load. The high strength coupling C is highly efficient and allows greater torque transmission than typical key/keyway couplings. The high strength coupling C provides perfect alignment of the members 10 and 16, requires no threaded connection, and is quick and easy to assemble and disassemble.

The high strength coupling C has many and varied uses in numerous industries and applications. The high strength coupling C can be used in applications in which torque and/or axial loads are to be transferred from one member to another. For example, the high strength coupling C can be used for drive shaft couplings, automatic break-outs, shock subs, saver subs, pull swivels and tool joints, just to name a few.

Some of the various configurations of the high strength coupling C have been shown in the drawings and are intended to be representative of the various adaptations which might be used. The preferable configuration for a certain application will be determined from various parameters, for example design loads, strengths of the various materials being joined and used to form the coupling, physical coupling dimension limitations, size of members being joined, tooling availability, and manufacturing costs. For example, it has been found that for joining cylindrical members having a diameter of approximately 2" or smaller that the preferred design is to use two keys of the type shown in FIGS. 1–5 as opposed to the rounded keys shown in FIGS. 6–8. When joining cylindrical members having a diameter greater than approximately 2" the preferred design is to use three keys of the type shown in FIGS. 6–8.

The rounded key design as shown in FIGS. 6–8 is also the preferred design in applications where the coupling is going to be subjected to shock loads resulting from axial impacts. As stated above, the rounded keys improve the stress distribution resulting from shock loads.

As yet another example as to which configuration is the preferred coupling design, the general configuration of the high strength coupling C shown in FIGS. 6–8 has demonstrated a higher ultimate strength and loading capability than the embodiment shown in FIGS. 1 and 2, although the embodiment shown in FIGS. 6–8 requires different tooling equipment to manufacture the rounded openings and keys and may also have a slightly higher cost to manufacture. Both of these embodiments provide couplings of high strength which are easy to assemble and disassemble. However, if ultimate strength of the coupling is of primary importance, the embodiment shown in FIGS. 6–8 with the rounded corners provides higher ultimate strength and loading capability and would be the preferred coupling design. Although, for a particular application, the embodiment of FIGS. 1 and 2 may provide ample load capability, be easier to manufacture and at a slightly less cost than the embodiment of FIGS. 6–8 in which case the embodiment of FIGS. 1 and 2 may be preferred. Similarly, there will be certain applications where other of the embodiments shown in the drawings will be the most desirable coupling due to the circumstances.

The foregoing disclosure and description of the invention is illustrative and explanatory thereof, and various changes in the size, shape, and materials, as well as in the details of illustrative construction and assembly, may be made without departing from the spirit of the invention.

I claim:

1. A quick connect/disconnect coupling for transferring torque comprising:

a first cylindrical member having an outer peripheral surface and an end portion, said end portion having a transverse keyway in said outer peripheral surface;

a second cylindrical member having a receiving end portion, said receiving end portion having an end face with a longitudinal bore therein for receiving said end portion of said first cylindrical member, said receiving end portion having a transverse slot therethrough;

a key received in said transverse keyway and protruding therefrom into said transverse slot; and a retainer member extending over said key in said transverse slot of said receiving end portion of said second cylindrical member, wherein said key is freely received within said transverse keyway and said transverse slot and freely contained between said retainer member and said transverse keyway, said key non-rotatably connects said first cylindrical member to said second cylindrical member.

2. The coupling according to claim 1, further comprising a securing member for securing said retainer member over said transverse slot.

3. The coupling according to claim 2, wherein said securing member comprises:

a peripheral groove in said receiving end portion; and a snap ring inserted in said peripheral groove and protruding therefrom, wherein said snap ring limits the longitudinal movement of said retainer member.

4. The coupling according to claim 1, wherein said receiving end portion has a cylindrical outer surface and said key has an arcuate surface corresponding to the cylindrical outer surface of said end portion.

5. The coupling according to claim 4, wherein said first cylindrical member has a longitudinal axis and said transverse keyway comprises:

a pair of parallel side surfaces transverse to the longitudinal axis; and a bottom surface between said pair of parallel side surfaces, said bottom surface parallel to a tangent of said first cylindrical member.

6. The coupling according to claim 5, wherein said second cylindrical member has a longitudinal axis in axial alignment with the longitudinal axis of said first cylindrical member and said transverse slot comprises:

a pair of parallel side walls transverse to the longitudinal axis; and a pair of end walls between said pair of parallel side walls, said pair of end walls transverse to said bottom surface of said transverse keyway.

7. The coupling according to claim 6, wherein said key has a thickness of approximately the distance between said pair of parallel side walls of said transverse slot.

8. The coupling according to claim 6, wherein said key has a substantially planer surface having a length of approximately the length of said bottom surface of said transverse keyway.

9. The coupling according to claim 5, wherein said key has a thickness of approximately the distance between said pair of parallel side surfaces of said transverse keyway.

10. The coupling according to claim 5, wherein said key has a thickness and the distance between said pair of parallel side surfaces of said transverse keyway is greater than the thickness of said key to permit axial movement of one said cylindrical member relative to the other said cylindrical member.

11. A quick connect/disconnect coupling for transferring torque and axial force comprising:

a first cylindrical member having an outer peripheral surface and an end portion;

a second cylindrical member having a receiving end portion, said receiving end portion having an end face with a longitudinal bore therein for receiving said end portion of said first cylindrical member;

said end portion of said first cylindrical member having a plurality of transverse keyways in said outer peripheral surface;

said receiving end portion of said second cylindrical member having a plurality of transverse slots therein;

a plurality of keys wherein one said key is received in one said transverse keyway and protrudes therefrom into one said transverse slot; and a retainer ring having a bore therethrough such that said retainer ring freely extends over said keys in said plurality of transverse slots of said receiving end portion of said second cylindrical member and said keys fit freely between said retainer ring and said transverse keyways, wherein said keys axially and non-rotatably connect said first cylindrical member to said second cylindrical member.

12. The coupling according to claim 11, wherein said receiving end portion has a cylindrical outer surface and each said key has an arcuate surface corresponding to said cylindrical outer surface of said receiving end portion, wherein said first cylindrical member has a longitudinal axis and each said transverse keyway comprises:

a pair of parallel side surfaces transverse to the longitudinal axis; and a bottom surface between said pair of parallel side surfaces, said bottom surface parallel to a tangent of said first cylindrical member;

wherein said second cylindrical member has a longitudinal axis in axial alignment with the longitudinal axis of said first cylindrical member and each said transverse slot comprises:

a pair of parallel side walls transverse to the longitudinal axis; and a pair of end walls between said pair of parallel side walls, wherein each said pair of end walls are generally transverse to said bottom surface of a corresponding said transverse keyway.

13. The coupling according to claim 12, wherein each said key has a thickness of approximately the distance between said pair of parallel side surfaces of said corresponding transverse keyway.

14. The coupling according to claim 12, wherein each said key has a thickness of approximately the distance between said pair of parallel side walls of said corresponding transverse slot.

15. The coupling according to claim 12, wherein each said key has a substantially planer surface having a length of approximately the length of said bottom surface of said transverse keyway.

16. The coupling according to claim 11, wherein said plurality of transverse keyways are in a plane transverse to the longitudinal axis of said first cylindrical member.

17. The coupling according to claim 11, wherein said plurality of transverse keyways are spaced equidistantly around said first cylindrical member.

18. The coupling according to claim 11, wherein said plurality of transverse keyways are in at least two parallel planes transverse to the longitudinal axis of said first cylindrical member.

19. A quick connect/disconnect coupling for transferring torque comprising:

a first cylindrical member having an outer peripheral surface and an end portion, said end portion having a transverse keyway in said outer peripheral surface;

a second cylindrical member having a receiving end portion, said receiving end portion having an end face with a longitudinal bore therein for receiving said end portion of said first cylindrical member, said receiving end portion having a transverse slot therethrough;

a key received in said transverse keyway and protruding therefrom into said transverse slot;

a retainer ring having a bore therethrough such that said retainer ring extends over said key in said transverse slot of said receiving end portion of said second cylindrical member and said key fits between said retainer ring and said transverse keyway;

wherein said cylindrical members are interengaged by said key independent of deformation of said cylindrical members.

* * * * *